US010612344B2

(12) United States Patent
El Mallawany et al.

(10) Patent No.: US 10,612,344 B2
(45) Date of Patent: Apr. 7, 2020

(54) DOWNHOLE CONTROL AND SENSING SYSTEM

(71) Applicant: Halliburton Energy Services, Inc., Houston, TX (US)

(72) Inventors: Ibrahim El Mallawany, Spring, TX (US); Gireesh Bhat, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 327 days.

(21) Appl. No.: 15/523,869

(22) PCT Filed: Jan. 12, 2016

(86) PCT No.: PCT/US2016/012930
§ 371 (c)(1),
(2) Date: May 2, 2017

(87) PCT Pub. No.: WO2017/123202
PCT Pub. Date: Jul. 20, 2017

(65) Prior Publication Data
US 2018/0051534 A1    Feb. 22, 2018

(51) Int. Cl.
*E21B 34/06* (2006.01)
*E21B 34/16* (2006.01)
*E21B 47/06* (2012.01)
*E21B 47/12* (2012.01)
*G01V 11/00* (2006.01)

(52) U.S. Cl.
CPC ........... *E21B 34/066* (2013.01); *E21B 34/16* (2013.01); *E21B 47/06* (2013.01); *E21B 47/12* (2013.01); *E21B 47/121* (2013.01); *G01V 11/002* (2013.01)

(58) Field of Classification Search
USPC ........................................... 307/112
See application file for complete search history.

(56) References Cited

U.S. PATENT DOCUMENTS

| 4,178,579 A * | 12/1979 | McGibbeny .......... E21B 17/003 307/127 |
| 4,543,527 A | 9/1985 | Schuchmann et al. |
| 4,652,876 A | 3/1987 | Darilek |
| 2009/0243399 A1 | 10/2009 | Williams |
| 2010/0237698 A1 * | 9/2010 | Smithson ................ E21B 23/00 307/38 |
| 2016/0259086 A1 * | 9/2016 | Grente .................. E21B 47/122 |

OTHER PUBLICATIONS

International Search Report and Written Opinion issued in corresponding PCT application No. PCT/US2016/012930, dated Oct. 12, 2016, 14 pgs.

* cited by examiner

Primary Examiner — Hal Kaplan
Assistant Examiner — Xuan Ly
(74) *Attorney, Agent, or Firm* — Chamberlain Hrdlicka

(57) ABSTRACT

A well system with an electrical control and sensing system includes a first conductor and a second conductor. A first switching circuit is coupled between the first conductor and the second conductor. The first switching circuit includes a first electrically powered device and a first diode coupled to the first electrically powered device. A sensor circuit is coupled between the first conductor and the second conductor. The sensor circuit includes a sensor and a sensor diode coupled to the sensor and configured to permit current flow through the sensor circuit from the second conductor to the first conductor.

21 Claims, 7 Drawing Sheets

DOWNHOLE CONTROL AND SENSING SYSTEM

BACKGROUND

This section is intended to provide background information to facilitate a better understanding of the various aspects of the described embodiments. Accordingly, it should be understood that these statements are to be read in this light and not as admissions of prior art.

Oil and gas wells formed in the earth and often traverse several formation layers or regions of the earth, which may include one or more hydrocarbon reservoirs. Production tubing is disposed in the well and production fluid from the hydrocarbon reservoirs flows to the surface through the production tubing. During some production operations, it may be beneficial to independently control the flow of fluid from different regions of each reservoir into the production tubing. Packers are disposed in an annulus between the wellbore and the production tubing to isolate a reservoir into different zones.

Each corresponding portion of the production tubing includes a valve. When the valve is open, fluid can flow from the respective reservoir zone into the production tubing. When the valve is closed, fluid from the respective reservoir zone is prevented from flowing into the production tubing. Thus, the flow of fluid from each zone into the production tubing can be controlled by controlling the opening and closing of the corresponding valve. In many systems, opening and closing of each valve requires electrical operation of an actuator such as a solenoid operated valve (SOV), a motor, a heating coil, among others. A single system may have many actuators (e.g., SOVs), each of which needs to be controllable independently of the others.

Additionally, oil and gas wells are instrumented with various sensors downhole to measure various conditions of the downhole environment and/or well parameters such as temperature, pressure. Such downhole sensors may need to be coupled to a cable that provides power to the sensors as well as a means of communicating data with surface facilities.

BRIEF DESCRIPTION OF THE DRAWINGS

For a detailed description of the embodiments of the invention, reference will now be made to the accompanying drawings in which.

DETAILED DESCRIPTION

The present disclosure provides an electrical system for selectively and individually controlling any number valves as well as providing downhole sensing means.

Figure 1:
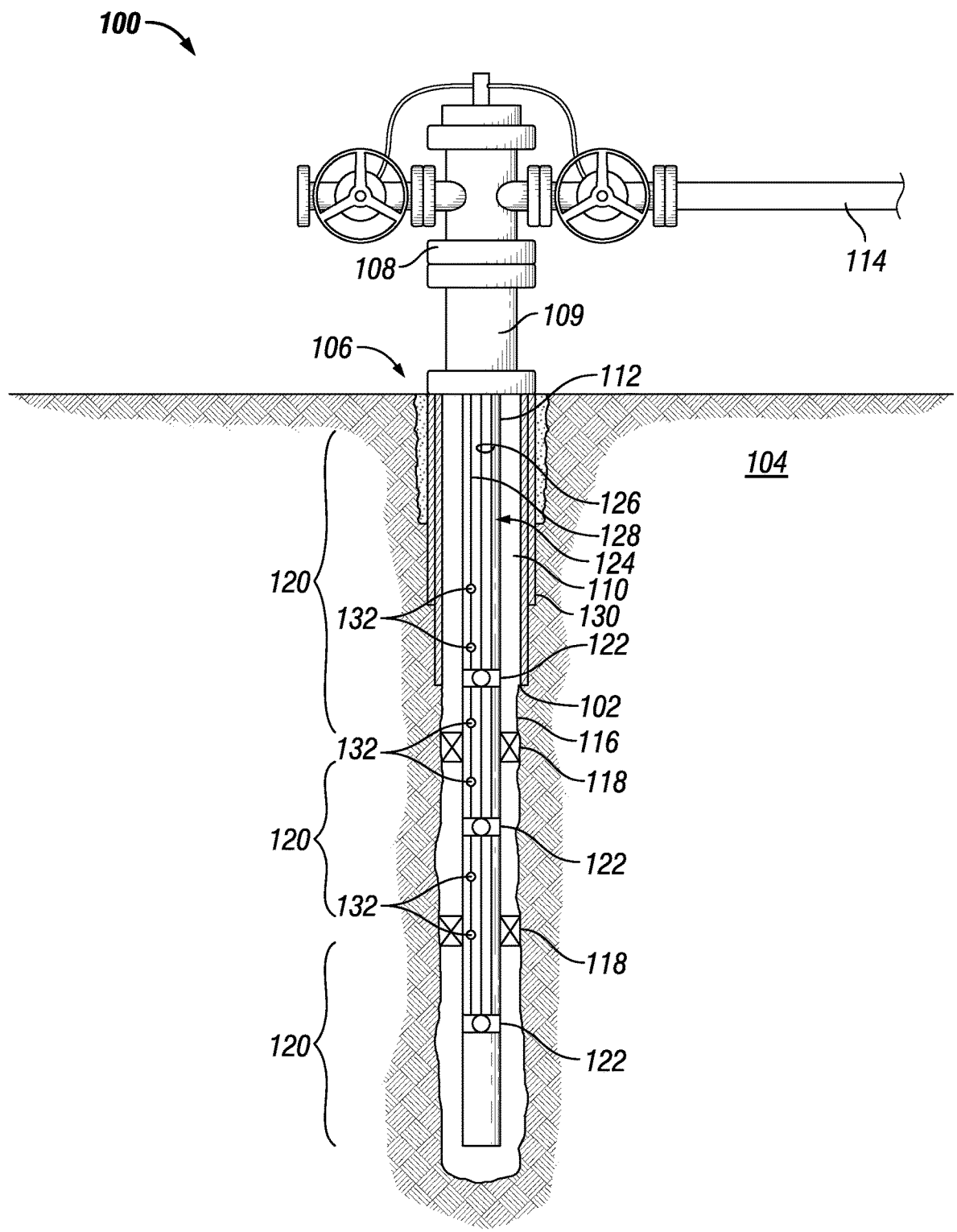
FIG. 1 illustrates a well system with a multi-zone control and sensing system.

FIG. 1 illustrates a production well system 100 with isolated production zones. The well system 100 includes a well 102 formed within a formation 104. The well 102 may be a vertical wellbore as illustrated or it may be a horizontal or directional well. The formation 104 may be made up of several geological layers and include one or more hydrocarbon reservoirs. In certain example embodiments, the well system 100 may include a production tree 108 and a wellhead 109 located at a well site 106. A production tubing 112 extends from the wellhead 109 into the well 102.

In some embodiments, the wellbore 102 is cased with one or more casing segments 130. The casing segments 130 help maintain the structure of the well 102 and prevent the well 102 from collapsing in on itself. In some embodiments, a portion of the well is not cased and may be referred to as "open hole." The space between the production tubing 112 and the casing 130 or wellbore wall 116 is an annulus 110. Production fluid enters the annulus 110 from the formation 104 and then enters the production tubing 112 from the annulus 110. The production tubing 112 carries the production fluid uphole to the production tree 108. The production fluid may then be delivered to various surface facilities for processing via a surface pipeline 114.

The well 102 is separated into a plurality of zones with packers 118 disposed in the annulus space 110. The packers 118 separate the well 102 into isolated zones 120. Each portion of the production tubing disposed within one of the zones 120 includes a production tubing valve 122. When the production tubing valve 122 is open, fluid can flow from the respective zone 120 into the production tubing 112. When the production tubing valve 122 is closed, fluid from the respective zone 120 is prevented from flowing into the production tubing 112. Thus, the flow of fluid from each zone 120 into the production tubing 112 can be controlled by controlling the opening and closing of the corresponding production tubing valve 122.

In some embodiments, the production tubing valves 122 are operated hydraulically and controlled by a valve control system 124. The valve control system 124 includes a hydraulic system with two hydraulic lines 126 and an electrical control and sensing system 128 having one or more conductors.

Figure 2:
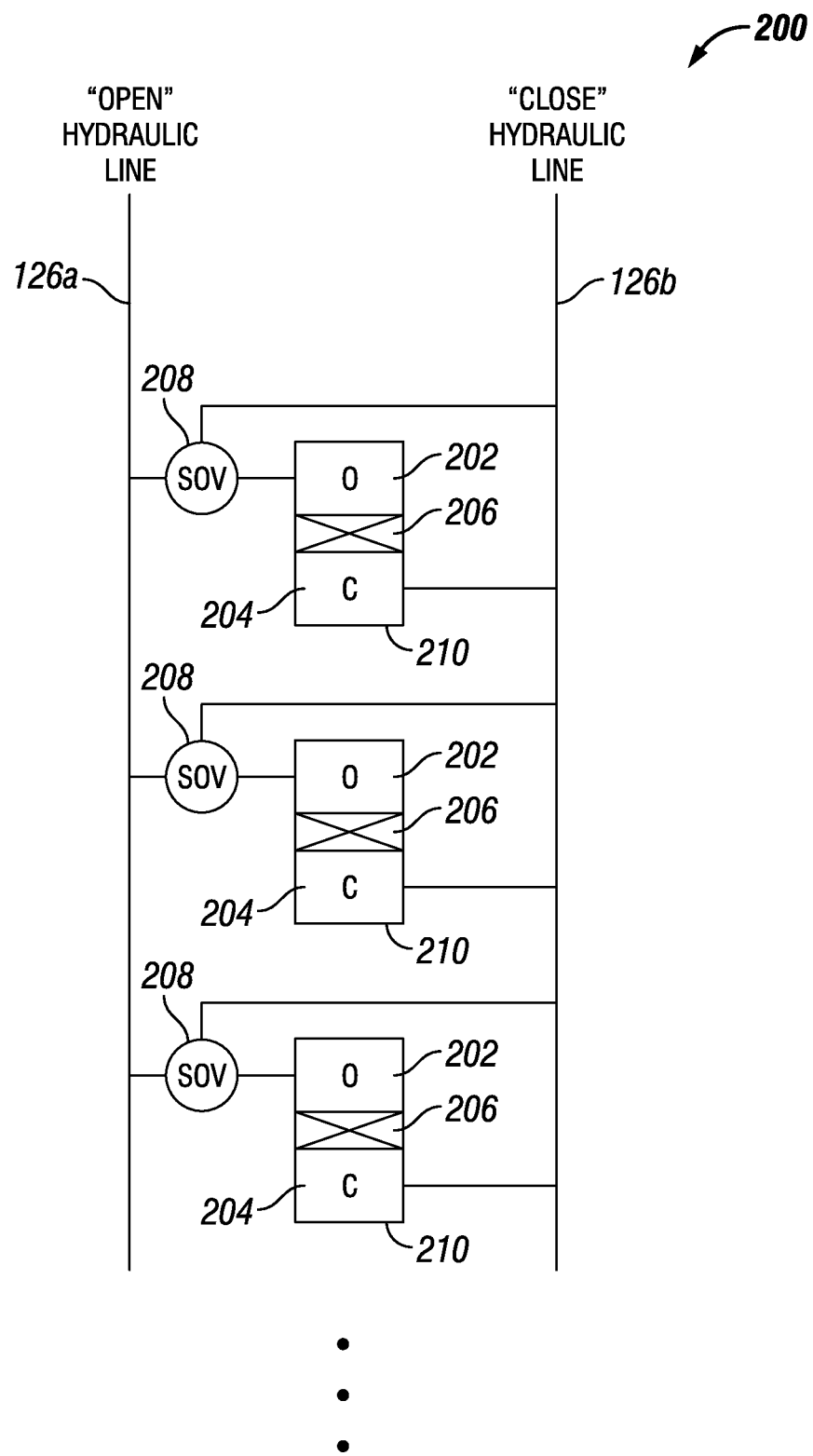
FIG. 2 is a schematic illustrating a hydraulic system of the valve control system.

FIG. 2 is a schematic illustrating an example hydraulic system 200 of the valve control system 124. The hydraulic system 200 includes an "open" hydraulic line 126a, a "close" hydraulic line 126b, and a piston device 210 coupled to each production tubing valve 122. Each piston device 210 includes a close chamber 210 and an open chamber 202, separated by a piston 206. The close chamber 210 is hydraulically coupled to the close hydraulic line 126b. The open chamber 202 is hydraulically coupled to an electrically powered device such as an SOV 208 that is coupled to both the open hydraulic line 126a and the close hydraulic line 126b. In some embodiments, the SOVs 208 can be replaced by motors or other devices configured to couple and decouple hydraulic lines similarly to the SOVs upon receiving an electric current.

The piston 206 is configured to move when there is a pressure differential between the close chamber 210 and the open chamber 202, thereby opening or closing the respective production tubing valve 122. Thus, in order to close the valve, the close chamber 204 is pressurized via the close hydraulic line 126b, bleeding the open chamber 202 through the open hydraulic line 126a. The piston 206 and the corresponding production tubing valve 122 are thereby moved into the close position. Inversely, in order to open a production tubing valve 122, the open chamber 202 is pressurized via the open hydraulic line 126a and the close chamber 210 is bled through the close hydraulic line 126b. In both cases, a pressure differential between the open hydraulic line 126a and the close hydraulic line 126b must be applied.

However, multiple piston devices 210 are controlled on the same open hydraulic line 126a and close hydraulic line 126b. Thus, in order to operate each the production tubing valves 122 independently and one at a time, one of chambers 202 and 204 (e.g., open chamber 202) of each piston device 210 is coupled to an SOV 208.

When there is no current flowing through an SOV 208 (i.e., the SOV 208 is not actuated), chamber 202 is hydraulically coupled to the close hydraulic line 126b and separated from the open hydraulic line 126a, and thus not affected by hydraulic pressure in the open hydraulic line 126a. When a current is flowing through the SOV 208 (i.e., the SOV 208 is actuated), chamber 202 is connected to the open hydraulic line 126a and separated from the close hydraulic line 126b.

Thus, a production tubing valve 122 can be controlled independently by actuating the corresponding SOV 208 and keeping the other SOVs 208 unactuated. The SOVs 208 are controlled via the electrical control and sensing system 128. The SOV 208 is one example of a class of devices called "electrically powered devices" 308 (FIG. 3) configured to enable individual control of the valves 122. In some embodiments, the electrically powered devices 308 can enable hydraulic actuation, electrical actuation, and mechanical actuation, among others. Additionally, the electrical control and sensing system 128 includes one or more sensors 132 for sensing and communicating one or more well conditions. The sensors 132 may include, for example, a temperature sensor, a pressure sensor, a flow meter, among others.

Figure 3:
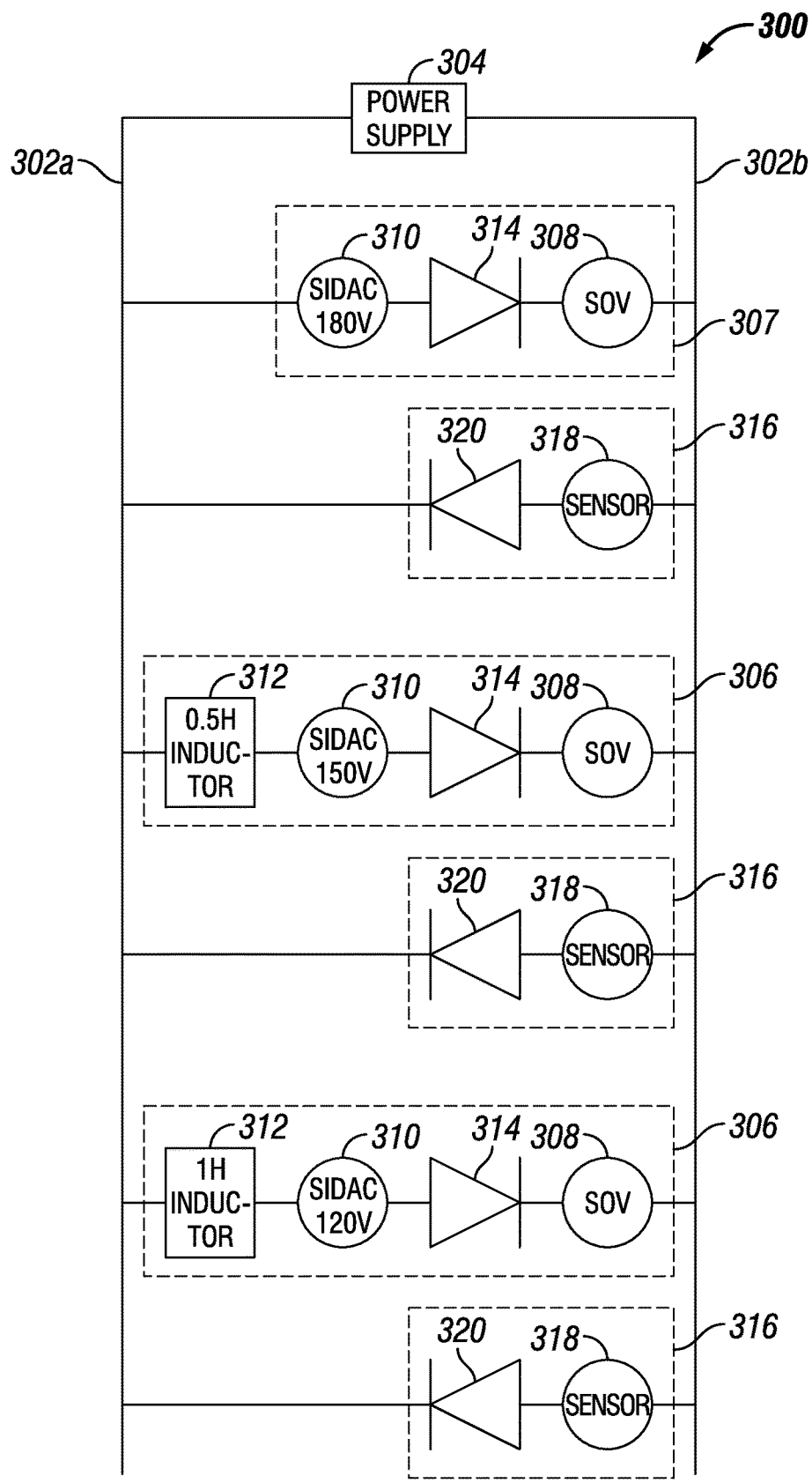
FIG. 3 is a schematic illustrating an example electrical control and sensing system utilizing two conductors.

FIGS. 3-7 illustrate example embodiments of the electrical system 128. FIG. 3 illustrates a schematic of an example electrical control and sensing system 300 for independently controlling the SOVs 208 as well as providing sensing means. Electrical control and sensing system 300 includes a first conductor 302a and a second conductor 302b. In some embodiments, the first conductor 302a may be an electrical line and the second conductor 302b may be the production tubing 112. The conductors 302 are coupled to a power supply 304 or control center above ground.

Electrical control and sensing system 300 further includes a switching circuit 306 coupled between the first conductor 302a and the second conductor 302b. The switching circuit 306 includes an electrically powered device 308, a switching thyristor 310, a voltage delay device 312, and a diode 314, which may be coupled in series. In some embodiments, the electrically powered device 308 may be the SOV 208. In some other embodiments, the SOV 208 may be replaced by another type of electrically powered device 308 such as a heating coil, a motor, an actuator, among others. The electrically powered device 308 may be configured to control connections of the hydraulic system of FIG. 2.

The switching thyristor 310 has a breakover voltage and is coupled to the electrically powered device 308 such that the switching thyristor 310 must receive a voltage at least as high as the breakover voltage for the electrically powered device 308 to receive the voltage and be actuated. The switching thyristor 310 may be a silicon diode for alternating current (SIDAC), a diode for alternating current (DIAC), among others.

The voltage delay device 312 is coupled to the switching thyristor 310 and configured to prevent a voltage from being applied to the switching thyristor 310 for an amount of time, also called a time delay. Specifically, the time delay is a duration between the voltage delay device 312 receiving a voltage and passing the voltage through to the switching thyristor 310 or more broadly, to the switching circuit 304. Thus, current only flows through the switching circuit 306, actuating the electrically powered device 308 after the time delay and if the voltage is at least as high as the breakover voltage of the switching thyristor 310. Otherwise, the electrically powered device 308 is not actuated. The voltage delay device 312 may be an inductor as illustrated or FIG. 3. In practice, the voltage delay device 312 may include a variety of electronic components, such as capacitors, resistors, inductors, transistors, thyristors, or any combination thereof, and among others.

In some configurations, the diode 314 of the switching circuit 306 is configured to permit current flow through the switching circuit 306 from the first conductor 302a to the second conductor 302b and block current flow from the second conductor 302b to the first conductor 302a. In some embodiments, the diode 314 is coupled in series with the electrically powered device 308. Thus, the electrically powered device 308 is only capable of being powered when the polarity of the power supply 310 is such that the current flows from the first conductor 302a to the second conductor 302b.

The electrical control and sensing system 300 may include a plurality of switching circuits 306 coupled in parallel between the first conductor 302a and the second conductor 302b. In some embodiments, each of the switching circuits 306 comprises a voltage delay device 312 providing a different time delay and a switching thyristor 310 having different breakover voltage. Generally, the amount of time delay and the breakover voltage level of a switching circuit 306 is inversely related such that the switching circuit 306 with the smallest time delay has the highest breakover voltage and the switching circuit 306 with the largest time delay has the lowest breakover voltage. In some embodiments, two switching circuits 306 may have the same time delay and breakover voltage if their diodes 314 are oriented in opposite directions. In some embodiments, one switching circuit 306 of the plurality may be absent a time delay device 312, such as switching circuit 307. In such an embodiment, the switching circuit 307 with no time delay includes a switching thyristor 310 with the highest breakover voltage. In some embodiments, the diodes 314 of all of the switching circuits 306 are coupled in the same direction (e.g., permitting current flow from the first conductor 302a to the second conductor 302b and blocking current flow from the second conductor 302b to the first conductor 302a).

The electrical control and sensing system 300 also includes one or more sensor circuits 316 coupled in parallel with the switching circuits 306 between the first conductor 302a and the second conductor 302b. Each sensor circuit 316 includes a sensor 318 and a diode 320 coupled in series. The diode 320 is coupled in the opposite direction as the diodes 314 of the switching circuits 306, thereby permitting current flow in a direction opposite of the direction in which the diodes 314 of the switching circuits 306 permit current flow. When current flows through a sensor circuit 316, power is delivered to the sensor 318 and communication is enabled. The sensor 318 may be any type of sensing device used downhole, such as but not limited to a temperature sensor, a pressure sensor, a flow sensor, a gauge, and any combination thereof. In some embodiments, each sensor circuit 316 may include a plurality of the same or different types of sensors.

The electrical control and sensing system 300 may include a plurality of sensor circuits 316 coupled in parallel between the first conductor 302a and the second conductor 302b. In some embodiments, the diodes 320 of all of the sensor circuits 316 are oriented to permit current flow in the same direction. Thus, all of the sensors 318 can be powered when the polarity of power supply is set to provide current flow in said direction.

A selected one of the electrically powered device 308 can be actuated by driving a current through the respective switching circuit 306, which includes providing a current between the first and second conductors 302 in the direction permitted by the diode 314, in which the voltage is at least as high as the breakover voltage of the switching thyristor 310 of the respective switching circuit 306 for at least as long as the time delay provided by the voltage delay device 312 of the respective switching circuit 306 and until the switching thyristor 310 breaks over. In order to avoid actuating any other electrically powered devices, the voltage is lower than the breakover voltage of any other switching thyristor 310 in series with a voltage delay device 312 providing a shorter time delay. After the switching thyristor 310 breaks over, the voltage is dropped to a level lower than the lowest breakover voltage of any of the switching thyristors 310. Thus, following this control scheme, only the selected electrically powered device 308 is actuated.

Figure 4:
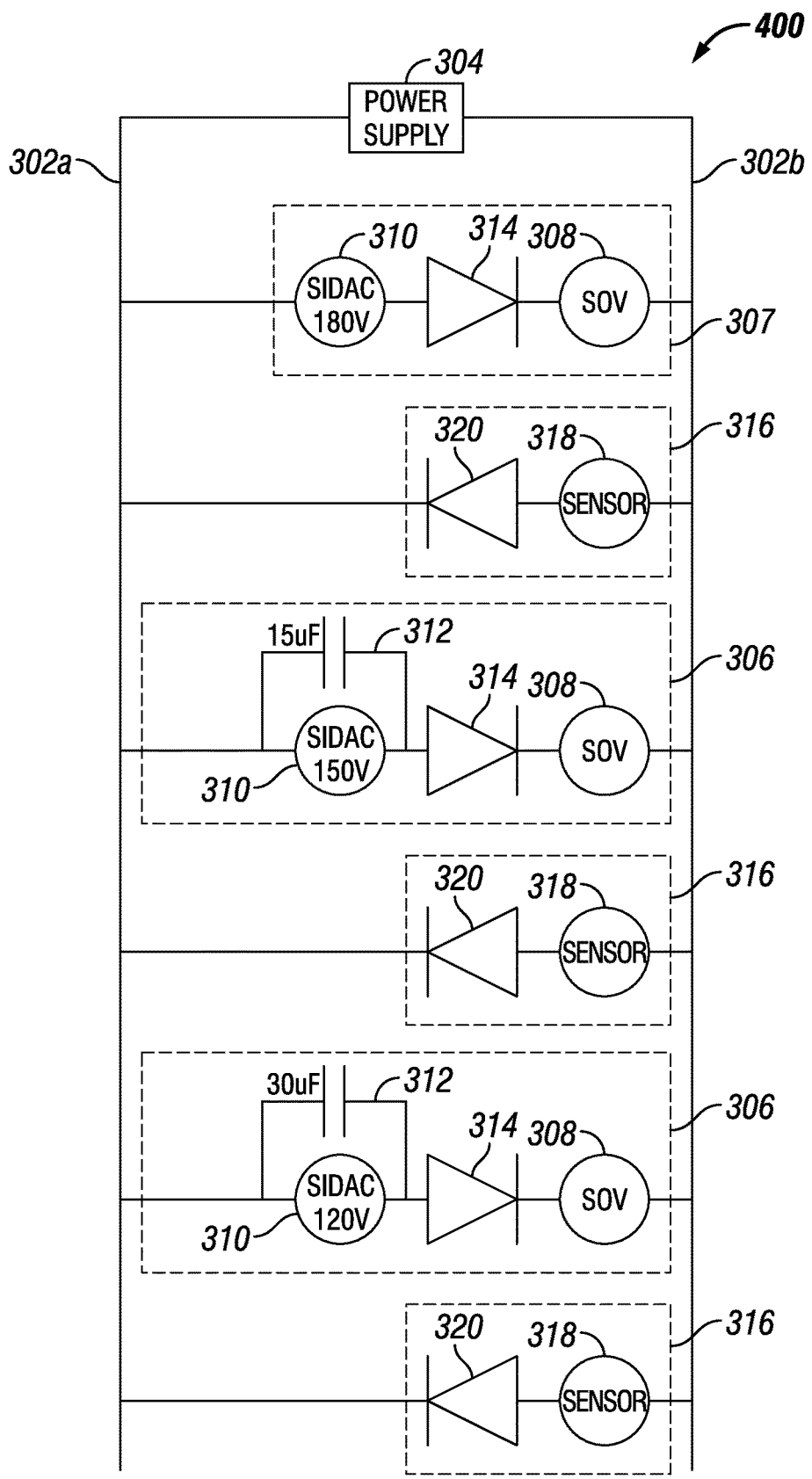
FIG. 4 is a schematic illustrating an example electrical control and sensing system utilizing two conductors and inductors as voltage delay devices.
Figure 5:
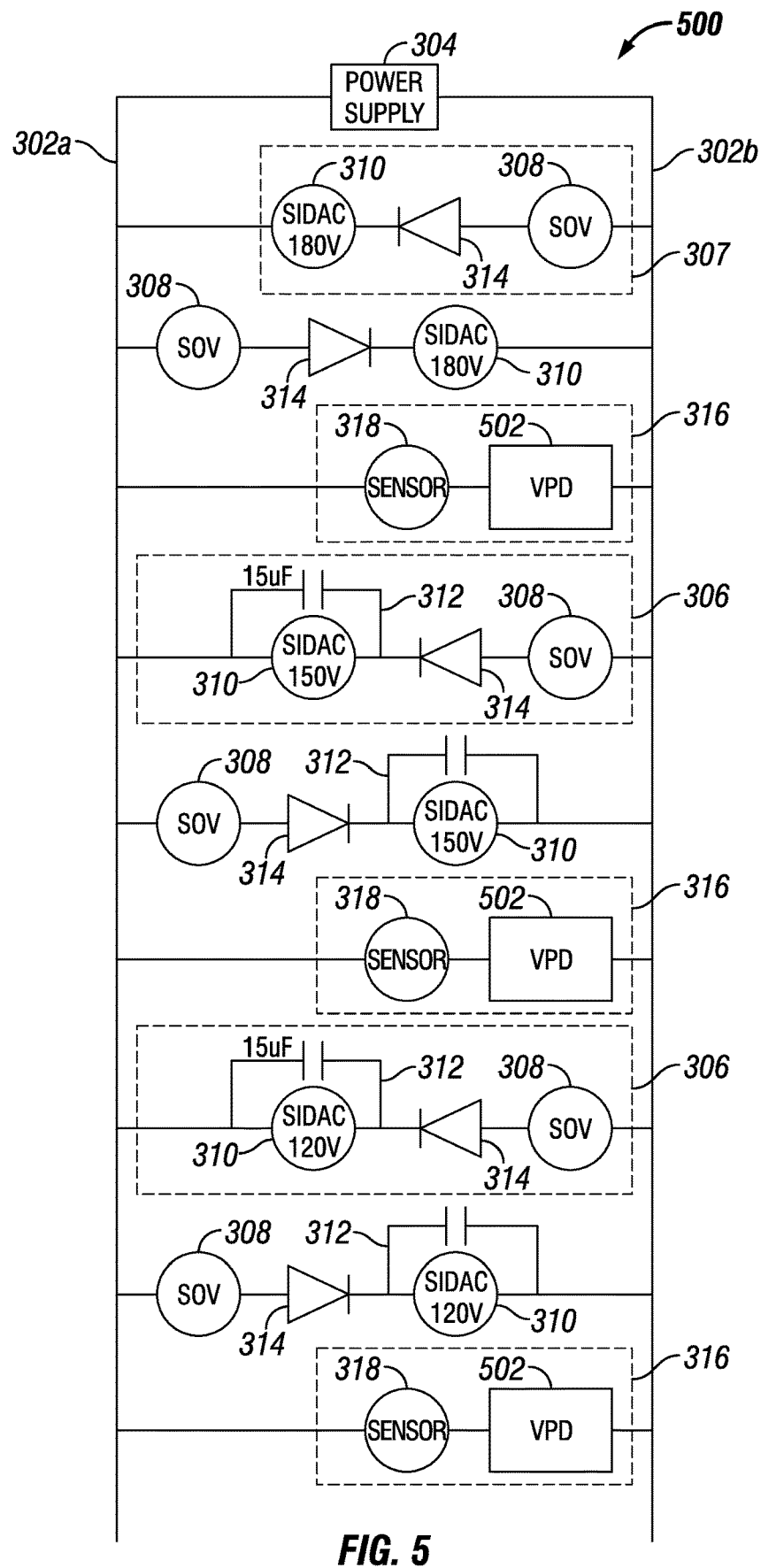
FIG. 5 is a schematic illustrating an example electrical control and sensing system utilizing two conductors and voltage protection devices.

FIG. 4 illustrates an embodiment of the electrical control device 400 in which capacitors are used as voltage delay devices 312. FIG. 5 illustrates an embodiment of an electrical control and sensing system 500 in which the sensor circuit 316 also includes a voltage protection device 502 such as a voltage limiter. The voltage protection device 502 is configured to protect the sensor circuit 316 and its components from voltages higher than the voltage rating of the components. In this embodiment, the diodes 314 of the switching circuits 306 and the diodes 320 of the sensor circuits 316 can be oriented to permit current flow in the same direction.

Figure 6:
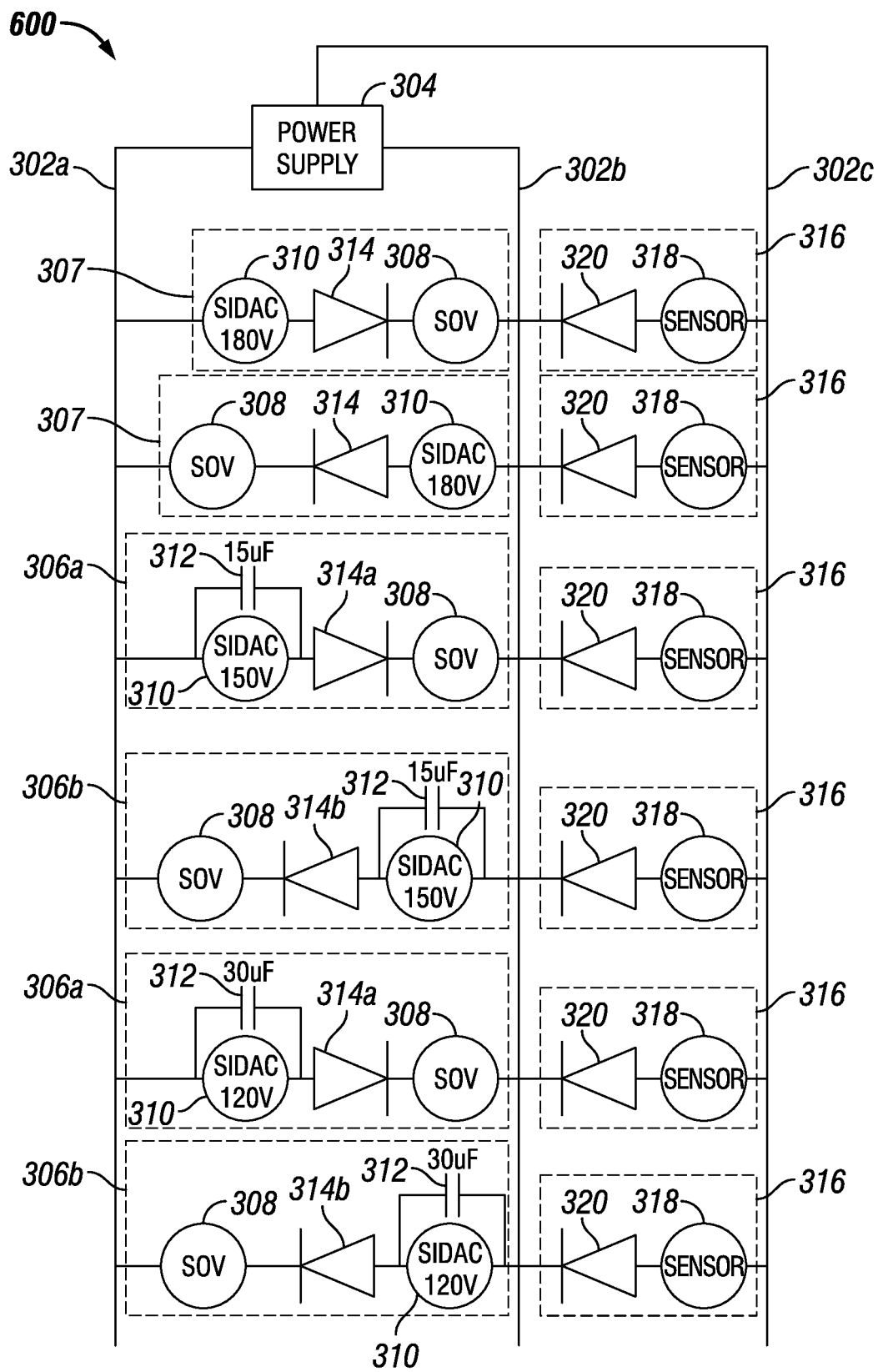
FIG. 6 is a schematic illustrating an example electrical control and sensing system utilizing three conductors.

FIG. 6 illustrates another example embodiment of an electrical control and sensing system 600. This electrical control and sensing system 600 includes a first conductor 302a, a second conductor 302b, and a third conductor 302c. In some embodiments, one of the conductors 302 may be the production tubing 112. In certain such embodiments, the first conductor 302a is production tubing 112 and the second conductor 302b and the third conductor 302c are packaged as a twisted pair cable, a coaxial cable, a dual-wire cable, or the like. The conductors 302 are coupled to a power supply 304 or control center above ground. Electrical control and sensing system 600 further includes a switching circuit 306 coupled between the conductor 302a and the second conductor 302b. The switching circuit 306 includes an electrically powered device 308, a switching thyristor 310, a voltage delay device 312, and a diode 314, which may be coupled in series. The electrical control and sensing system 600 may also include one or two switching circuits 307 without voltage delay devices.

The electrical control and sensing system 600 may include a plurality of the switching circuits 306 coupled in parallel between the first conductor 302a and the second conductor 302b. In some embodiments, each of the switching circuits 306 is either a right flowing switching circuit 306a or a left flowing switching circuit 306b. The right flowing switching circuits 306a each have a right flowing diode 314a. The left flowing switching circuits 306b each have a left flowing diode 314b. The right-flowing diodes 314a permit current flow from the first conductor 302a to the second conductor 302b. The right-flowing diodes 314a permit current flow from the first conductor 302a to the second conductor 302b.

In some embodiments, each of the right flowing switching circuits 306a comprises a voltage delay device 312 providing a different time delay and a switching thyristor 310 having different breakover voltage. Generally, the amount of time delay of a right flowing switching circuit 306a is inversely related the breakover voltage level such that the right flowing switching circuit 306a with the smallest time delay has the highest breakover voltage and the right flowing switching circuit 306a with the largest time delay has the lowest breakover voltage. The same applies to the left-flowing switching circuits 306b.

Two switching circuits 306 may have the same time delay and breakover voltage if their diodes 314 are oriented in opposite directions. In some embodiments, one or two switching circuits of the plurality may be absent a time delay device 312, such as switching circuits 307. In such an embodiment, the switching circuits 307 with no time delay include switching thyristor 310 with the highest breakover voltage.

The electrical control and sensing system 600 further includes a sensor circuit 316 coupled between the third conductor 302c and the second conductor 302b. The sensor circuit 316 includes a sensor 318 and a diode 320 coupled in series. The diode 320 is oriented to permit current flow through the sensor circuit 316 from the third conductor 302c to the second conductor 302b, thereby powering to the sensor 318 and enabling communication for the sensor 318. In some embodiments, the sensor circuit 316 may include a plurality of the same or different types of sensors. The electrical control and sensing system 600 may include a plurality of sensor circuits 316 coupled in parallel between the third conductor 302c and the second conductor 302b. In some embodiments, the diodes 320 of all of the sensor circuits 316 are oriented to permit current flow from the third conductor 302c to the second conductor 302b.

In some embodiments, the third conductor 302c is set at a positive polarity, and one of the first and second conductors 302a, 302b, is set at a negative plurality such that current flows through the sensor circuits 316 regardless of the direction of current flow between the first and second conductors 302a, 302b. Polarity between the first and second conductors 302a, 302b depends on which electrically powered device 308 is to be actuated, and specifically on whether the associated diode 314 is a left flowing diode 314b or a right flowing diode 314a. When none of the electrically powered devices 308 are to be actuated, and no current is to flow between the first and second conductors 302a, 302b, the first conductor 302a is open and the second conductor is set at negative polarity such that current still flows between the third and second conductors 302c, 302b, wherein powering the sensors 318.

Figure 7:
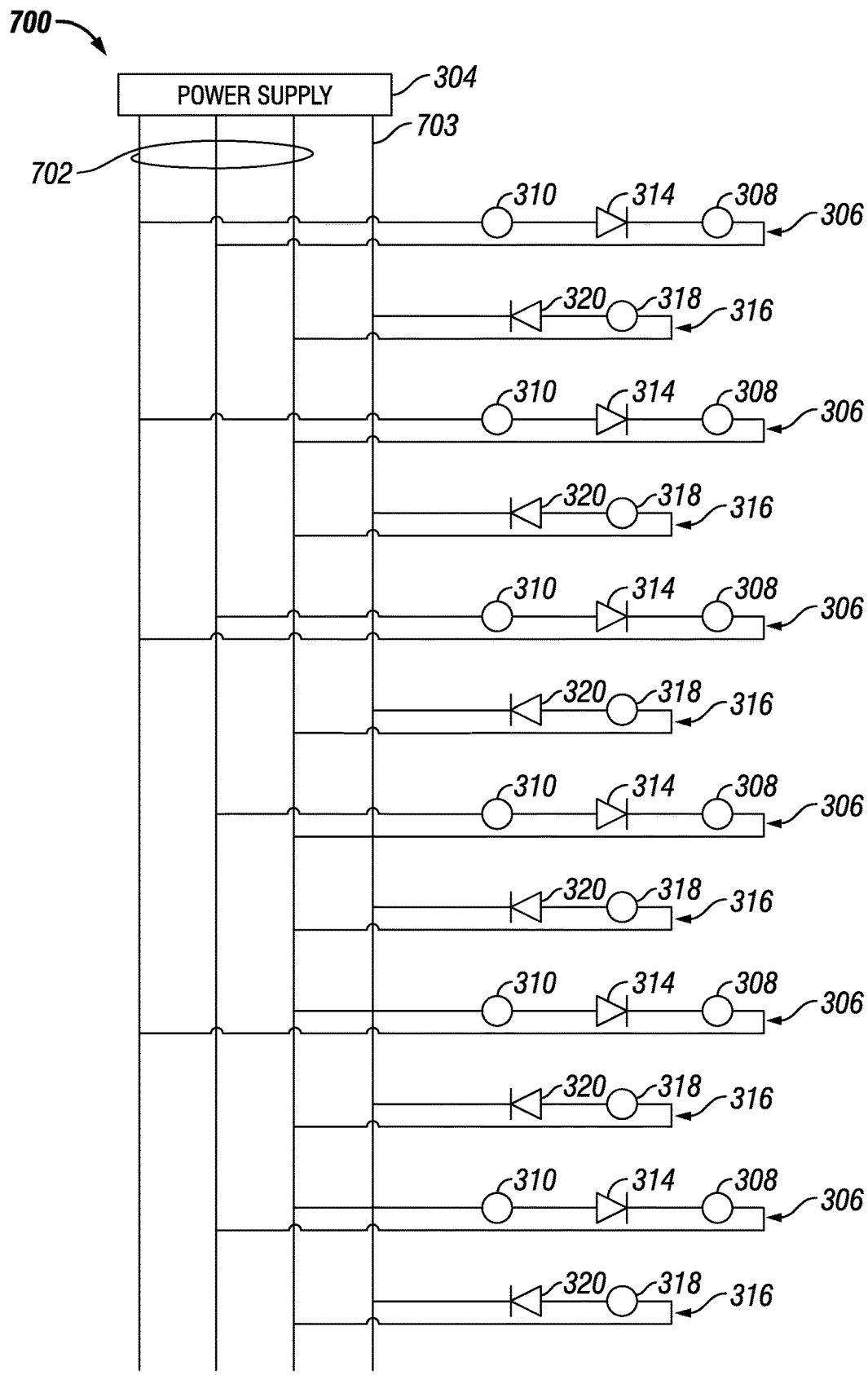
FIG. 7 is a schematic illustrating an example electrical control and sensing system utilizing a plurality of primary conductors and a secondary conductor.

FIG. 7 illustrates another example embodiment of an electrical control and sensing system 700. This electrical control and sensing system 700 includes a plurality of primary conductors 702 and a secondary conductor 703. The electrical control and sensing system 700 further includes a switching circuit 306 coupled between any two of the primary conductors 702. The switching circuit 306 includes an electrically powered device 308, a switching thyristor 310, and a diode 314. In some embodiments, the electrical control and sensing system 700 includes a plurality of switching circuit 306. Up to two switching circuits 306 can be coupled between any two of the primary conductors 702. The diodes of any two switching circuits 306 coupled between the same two primary conductors 702 are oriented to permit current flow in opposite directions.

In order to power a selected switching circuit and actuate the associated electrically powered device 308, a voltage differential is applied between the primary conductors to which the selected switching circuit is coupled, in which the polarity is set to provide current flow in the direction permitted by the associated diode 314, and the voltage differential is at least as high as the breakover voltage of the associated switching thyristor 310.

In order to power the sensors 318, the polarity of the secondary conductor 703 is set at negative and any subset of the primary conductors 702 are set at positive. Current flows through any sensor 318 coupled between a primary conductor 702 set at positive and the secondary conductor 703, and the sensor 318 is powered. The polarity of the primary conductors 702 depends on which electrically powered devices 308 are to be actuated. If none of the electrically powered devices 308 are to be actuated, then any number of the primary conductors 702 can be set at negative polarity and any other primary conductors 702 are open.

The electrical control and sensing system 700 further includes a sensor circuit 316 coupled between the secondary conductor 703 and one of the primary conductors 702. The sensor circuit 316 includes a sensor 318 and a diode 320 coupled in series. The diode 320 is oriented to permit current flow through the sensor circuit 316 from the primary conductor 702 to the secondary conductor 703, thereby powering to the sensor 318 and enabling communication for the sensor 318. In some embodiments, the sensor circuit 316 may include a plurality of the same or different types of sensors. The electrical control and sensing system 700 may include a plurality of sensor circuits 316 coupled in parallel between the primary conductor 702 and the secondary conductor 703. In some embodiments, all of the sensor circuits 316 are coupled between the secondary conductor and the same primary conductor 702, and the diodes 320 of all of the sensor circuits 316 are oriented to permit current flow from the primary conductor 702 to the secondary conductor 703.

In addition to the embodiments described above, many examples of specific combinations are within the scope of the disclosure, some of which are detailed below:

EXAMPLE 1

A well system with an electrical control and sensing system, comprising:
- a first switching circuit coupled between a first conductor and a second conductor, the first switching circuit comprising a first diode coupled to a first electrically powered device; and
- a sensor circuit coupled between the first conductor and the second conductor to permit current flow through the sensor circuit from the second conductor to the first conductor, the sensor circuit comprising a sensor diode coupled to a sensor.

EXAMPLE 2

The system of claim 1, further comprising a plurality of the sensor circuits coupled in parallel between the first conductor and the second conductor.

EXAMPLE 3

The system of claim 1, wherein the sensor circuit further comprises a voltage protection device.

EXAMPLE 4

The system of claim 1, wherein the sensor comprises a temperature sensor, a pressure sensor, a flow sensor, a downhole measurement device, or any combination thereof.

EXAMPLE 5

The system of claim 1, comprising a second switching circuit coupled in parallel with the first switching circuit between the first and second conductors, the second switching circuit comprising:
- a second electrically powered device;
- a switching thyristor having a breakover voltage and coupled to the second electrically powered device;
- a voltage delay device coupled to the switching thyristor to prevent a voltage from being applied to the switching thyristor for a time delay; and
- a second diode coupled between the first conductor and second conductor and configured to permit electron flow through the switching circuit from the first conductor to the second conductor.

EXAMPLE 6

The system of claim 1, wherein the first electrically powered device comprises a solenoid operated valve, a motor, a heating element, a sonic device, or any combination thereof.

EXAMPLE 7

The system of claim 1, wherein the first and second conductors are packaged as a twisted pair cable, a coaxial cable, or a dual-wire cable.

EXAMPLE 8

The system of claim 1, wherein the first diode is configured to permit current flow through the switching circuit from the first conductor to the second conductor.

EXAMPLE 9

The system of claim 3, wherein the sensor diode is configured to permit current flow through the sensor circuit from the first conductor to the second conductor and prevent current flow from the second conductor to the first conductor.

EXAMPLE 10

A method of operating a sensor and actuating a selected electrically powered device among a plurality of electrically powered devices coupled between a first conductor and second conductor, comprising:
- applying a high voltage differential between the first conductor and the second conductor, the high voltage being at least as high as the breakover voltage of a switching thyristor coupled to the selected electrically powered device;
- applying a low voltage differential between the first conductor and the second conductor after applying the high voltage, the low voltage being lower than the breakover voltage of any switching thyristor coupled to the plurality of electrically powered devices; and powering a sensor wired to at least one of the first conductor and second conductor.

EXAMPLE 11

The method of claim 10, wherein the sensor is powered by applying a sensor voltage differential between the first conductor and the second conductor in the opposite polarity that the high voltage and the low voltage are applied.

EXAMPLE 12

The method of claim 10, further comprising reducing the high voltage to the low voltage after a time delay, the time delay being at least as long as the amount of time it takes for a voltage delay device coupled to the switching thyristor coupled to the selected electrically powered device to transmit the high voltage.

EXAMPLE 13

The method of claim 12, wherein the time delay is less than the amount of time it takes for another time delay element coupled to another switching thyristor whose breakover voltage is less than the high voltage to pass the high voltage.

EXAMPLE 14

The method of claim 10, wherein powering the sensor comprises applying a sensor voltage between a third conductor and the first conductor or second conductor.

EXAMPLE 15

An electrical control and sensing device, comprising:
a plurality of primary conductors;
a first switching circuit coupled between a first pair of the primary conductors, the switching circuit comprising a first switching thyristor, a first diode, and a first electrically powered device;
a secondary conductor; and
a sensor circuit coupled between the secondary conductor and one of the primary conductors.

EXAMPLE 16

The device of claim 15, further comprising a second switching circuit coupled between the first pair of the primary conductors, wherein the second circuit comprises a second switching thyristor, a second diode, and a second electrically powered device, wherein the first diode and the second diode permit current flow in opposite directions.

EXAMPLE 17

The device of claim 15, further comprising a plurality of switching circuits, wherein one or two of the plurality of switching circuits are coupled in between any two of the plurality of primary conductors.

EXAMPLE 18

The device of claim 17, wherein any two switching circuits coupled between the same two primary conductors each comprise a diode, the diodes permitting current flow in opposite directions.

EXAMPLE 19

The device of claim 15, wherein the sensor circuit comprises a sensor diode and a sensor, the sensor diode permitting current flow towards the secondary conductor.

EXAMPLE 20

The device of claim 15, comprising a plurality of the sensor circuits coupled in parallel between one of the primary conductors and the secondary conductor.

EXAMPLE 21

The device of claim 15, wherein the first electrically powered device is configured to couple or decouple a control line when powered.

EXAMPLE 22

The device of claim 15, further comprising a second switching circuit coupled between the secondary conductor and one of the plurality of primary conductors.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A well system with an electrical control and sensing system, comprising:
a first switching circuit coupled between a first conductor and a second conductor, the first switching circuit comprising a first diode coupled to a first electrically powered device; and
a sensor circuit coupled between the first conductor and the second conductor to permit current flow through the sensor circuit from the second conductor to the first conductor, the sensor circuit comprising a sensor diode coupled to a sensor; and
a second switching circuit coupled in parallel with the first switching circuit between the first and second conductors, the second switching circuit comprising:
a second electrically powered device;
a switching thyristor having a breakover voltage and coupled to the second electrically powered device;
a voltage delay device coupled to the switching thyristor to prevent a voltage from being applied to the switching thyristor for a time delay; and
a second diode coupled between the first conductor and second conductor and configured to permit electron flow through the switching circuit from the first conductor to the second conductor.

2. The system of claim 1, further comprising a plurality of the sensor circuits coupled in parallel between the first conductor and the second conductor.

3. The system of claim 1, wherein the sensor circuit further comprises a voltage protection device.

4. The system of claim 1, wherein the sensor comprises a temperature sensor, a pressure sensor, a flow sensor, a downhole measurement device, or any combination thereof.

5. The system of claim 1, wherein the first electrically powered device comprises a solenoid operated valve, a motor, a heating element, a sonic device, or any combination thereof.

6. The system of claim 1, wherein the first and second conductors are packaged as a twisted pair cable, a coaxial cable, or a dual-wire cable.

7. The system of claim 1, wherein the first diode is configured to permit current flow through the switching circuit from the first conductor to the second conductor.

8. The system of claim 3, wherein the sensor diode is configured to permit current flow through the sensor circuit from the first conductor to the second conductor and prevent current flow from the second conductor to the first conductor.

9. A method of operating a sensor in a wellbore system and actuating a selected electrically powered device among a plurality of electrically powered devices coupled within the wellbore between a first conductor and second conductor, comprising:
applying a high voltage differential between the first conductor and the second conductor, the high voltage being at least as high as the breakover voltage of a switching thyristor coupled to the selected electrically powered device;
applying a low voltage differential between the first conductor and the second conductor after applying the high voltage, the low voltage being lower than the breakover voltage of any switching thyristor coupled to the plurality of electrically powered devices; and
powering a sensor wired to at least one of the first conductor and second conductor.

10. The method of claim 9, wherein the sensor is powered by applying a sensor voltage differential between the first conductor and the second conductor in the opposite polarity that the high voltage and the low voltage are applied.

11. The method of claim 9, further comprising reducing the high voltage to the low voltage after a time delay, the time delay being at least as long as the amount of time it takes for a voltage delay device coupled to the switching thyristor coupled to the selected electrically powered device to transmit the high voltage.

12. The method of claim 11, wherein the time delay is less than the amount of time it takes for another time delay element coupled to another switching thyristor whose breakover voltage is less than the high voltage to pass the high voltage.

13. The method of claim 9, wherein powering the sensor comprises applying a sensor voltage between a third conductor and the first conductor or second conductor.

14. An electrical control and sensing device located in a wellbore, comprising:
a plurality of primary conductors extending into the wellbore;
a first switching circuit coupled between a first pair of the primary conductors, the switching circuit comprising a first switching thyristor, a first diode oriented in a first direction, and a first electrically powered device;
a secondary conductor; and
a sensor circuit coupled between the secondary conductor and one of the primary conductors of the first pair of the primary conductors, wherein the sensor circuit comprises a diode oriented in a second direction opposite the first direction.

15. The device of claim 14, further comprising a second switching circuit coupled between the first pair of the primary conductors, wherein the second circuit comprises a second switching thyristor, a second diode, and a second electrically powered device, wherein the first diode and the second diode permit current flow in opposite directions.

16. The device of claim 14, further comprising a plurality of switching circuits, wherein one or two of the plurality of switching circuits are coupled in between any two of the plurality of primary conductors.

17. The device of claim 16, wherein any two switching circuits coupled between the same two primary conductors each comprise a diode, the diodes permitting current flow in opposite directions.

18. The device of claim 14, wherein the sensor circuit comprises a sensor diode and a sensor, the sensor diode permitting current flow towards the secondary conductor.

19. The device of claim 14, comprising a plurality of the sensor circuits coupled in parallel between one of the primary conductors and the secondary conductor.

20. The device of claim 14, wherein the first electrically powered device is configured to couple or decouple a control line when powered.

21. The device of claim 14, further comprising a second switching circuit coupled between the secondary conductor and one of the plurality of primary conductors.

* * * * *